United States Patent Office 3,392,332
Patented July 9, 1968

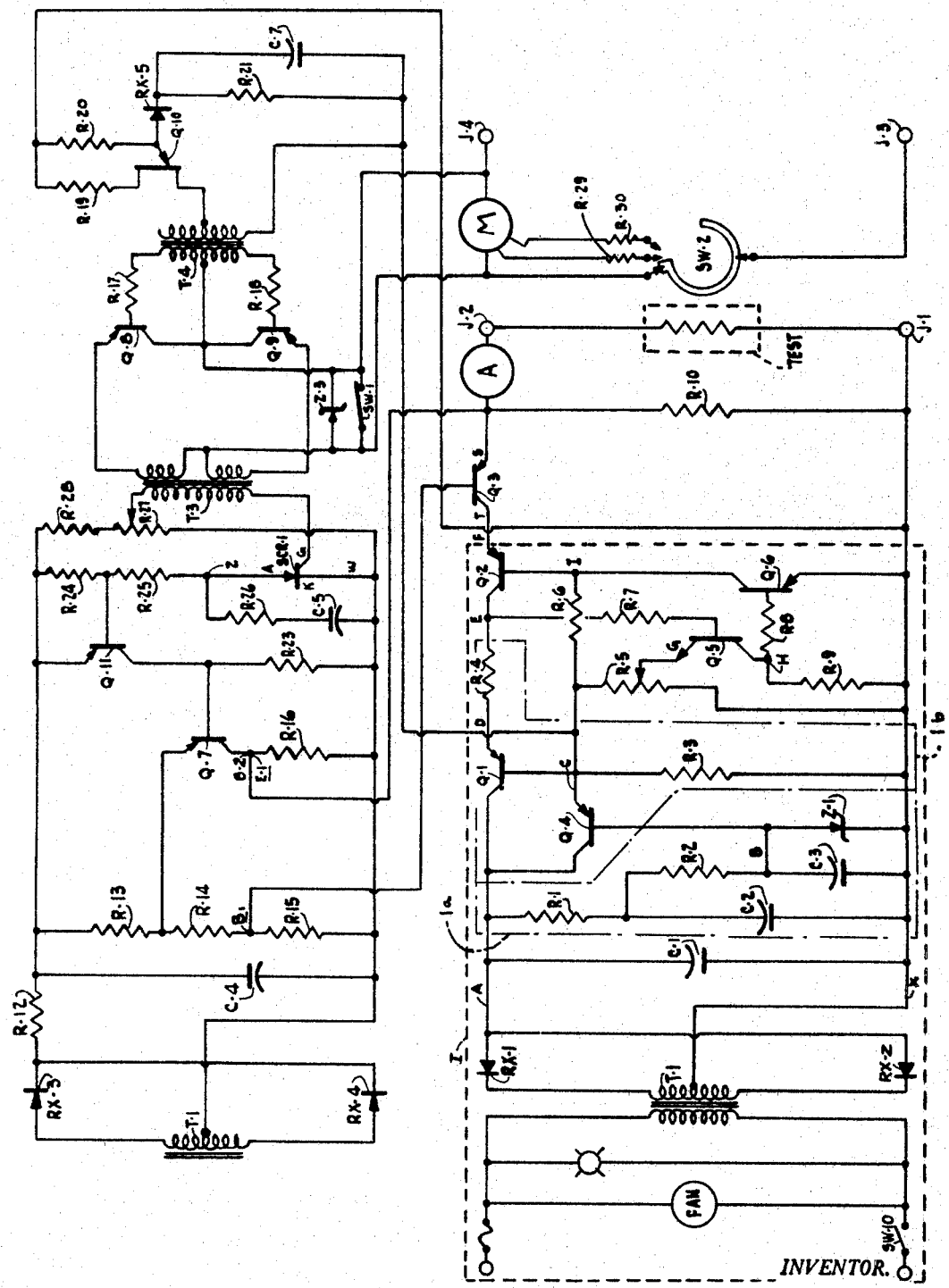

3,392,332
MILLIVOLT DROP INDICATOR HAVING A CURRENT REGULATED POWER SUPPLY AND MEANS TO PROTECT THE INDICATOR AGAINST OVERVOLTAGE
William Christensen, 24321 Martha Washington, Southfield, Mich. 48075
Filed Mar. 21, 1963, Ser. No. 266,929
3 Claims. (Cl. 324—110)

The present invention relates to new and useful improvements in electronic test equipment, and more particularly to a millivolt drop indicator having a meter circuit which is automatically actuated in the event of an overload, to protect said meter for the duration of the overload period.

In view of the low magnitude of voltage that exists across conducting devices, it is necessary when testing under such conditions to use a voltmeter in the low millivolt range. When using such a meter, extreme caution must be taken to avoid the possibility of presenting a high potential across the meter, which of course would result in destruction of the meter. Because of this, millivolt drop measurements have been undertaken only by highly trained technical personnel, under laboratory conditions. These conditions of course are not conducive nor applicable to production testing for many reasons. However, with the present invention, millivolt drop tests can now be made under actual working, as well as production conditions, using non-technical help. This can be accomplished without danger to the individual or the test equipment.

The present invention is found in a single self-contained, compact portable package which contains a current source that is electronically filtered and automatically regulated for both line and load variations. The meter protection circuit of the invention is completely automatic and functions throughout the period of overload, irrespective of the time duration. The protection of the millivolt meter is accomplished by taking the D.C. signal that goes into the meter and converting it to A.C. Thereafter, amplifying it through a chopper system, the resulting A.C. being proportional to the D.C. across the meter and millivolt leads. The A.C. signal is a function of the applied voltage across the millivolt leads which reverse biases the circuit so that no current flows out of the power supply. Since the millivolt drop across any given circuit of rated current is the most accurate and reliable method of anticipating a circuit failure, the use of the present invention now permits the continual checking of any given circuit under actual operating conditions. Such a check might be made in connection with a continually opening and closing switch circuit in which a production switch is undergoing a life test.

It is therefore a primary object of the present invention to provide a portable, self contained, accurate and durable electronic test instrument which incorporates the use of a regulated current supply and a millivolt drop meter protective circuit which is operative only under conditions of overload.

Another object of the invention is the provision of a relatively inexpensive test instrument wherein the accuracy is in the one percent (1.0%) range, as opposed to an expensive vacuum tube volt meter with a nominal accuracy of about three percent (3.0%), which must be used in combination with an independently regulated power supply that is remotely located.

Still another object of the present invention is the provision of a single instrument having its own current source in which the calibration can be immediately verified by technical as well as non-technical personnel, as opposed to a meter which must be calibrated in a laboratory, using a secondary current source which is independent of the current source actually used during tests.

Another object of the invention is the provision of a millivolt drop indicator wherein the signal is fed directly into the meter to control the output of the regulated current source, so that if the scale range of the meter is exceeded, the current will be automatically cut off immediately, however, when the millivolt drop returns to a condition within the predetermined range of the meter, the current source is automatically activated.

Still another object of the invention is the provision of an electronic test instrument which does not require the use of calibrated leads, because of the low current draw of the millivolt meter.

Another object of the present invention is the provision of an electronic test instrument which employs the use of solid state elements, thereby eliminating the necessity of instrument warm up prior to making any test readings.

Still another object is the provision of a test instrument which is operable over a wide range of scale readings.

Other objects of this invention will appear in the following description and appended claims, reference being had to the accompanying drawings forming a part of this specification, wherein like reference characters designate corresponding parts in the several views.

In the drawings:

The single figure is a schematic diagram which illustrates the invention.

A conventional regulated current source is shown in dotted line and identified by the numeral I. Within the regulated current source is an electronic filter which is contained in a second box shown in dot-dash lines and numbered I–a, while a voltage follower used to regulate the voltage due to line changes is identified by numeral I–b, and is contained in a dot-dot-dash line box. A potentiometer R–5 is used in the circuit to regulate the current within the range of the instrument. The potentiometer R–5 is physically located in front of the instrument and will maintain a pre-set current automatically.

The rectified voltage at point A is negative with respect to point X because of the rectification of current through diodes RX–1 and RX–2, with the resulting potential appearing on the collector of transistor Q–4. The base of transistor Q–4 is connected to a voltage reference Zener diode Z–1, and any change between points A and X with respect to amplitude will result in a change at the collector of transistor Q–4. The amplification which occurs at transistor Q–4 controls transistor Q–1 in an opposite direction to the change of input and therefore the output at D will become a constant value. D is the emitter of transistor Q–1, while C is the emitter of transistor Q–4. The resistor R–4 is in series with the load under test as well as the power transistor Q–2. Therefore any change in the current resulting from changes in the external circuit under test will have that change represented by a voltage across resistor R–4 at point E. As the current increases, there will be a greater drop across transistor Q–2 and E will become greater. This in turn through a two stage transistorized amplifier Q–5 and Q–6 will control the current regulating transistors Q–1 and Q–2 so that their ability to pass current will be constant.

The two stage transistorized amplifier Q–5 and Q–6 picks up any difference in current across the resistor and therefore will result in a resistance change at the transistors Q–5 and Q–6, with the end result, the current is constant in the system. While a regulated current supply is shown, a battery could be substituted therefor.

Transistor Q–3 is a power transistor and normally operates at full conduction. In the present instance, the voltage drop across transistor Q–3 is in the order of three-tenths (0.3) of a volt. This is the device which receives the signal that the range of the instrument has been exceeded and operates automatically to present a high resistance to the circuit, thereby interrupting the flow of current.

The second power source has another set of rectifiers RX-3 and RX-4, a filter R-12 and C-4 which supplies the bias from the base to the emitter on transistor Q-3. Normally this bias is negative with respect to the emitter of the transistor Q-3. However, when a cut-off signal is received, a pre-determined current must flow, so as to permit an automatic cut-in when the circuit has returned to normal. Because of the low potential, the signal is converted to A.C. with a solid state transistorized chopper using transistors Q-8 and Q-9 and transformers T-3 and T-4. Transistor Q-10 is the A.C. drive for the chopper. The A.C. output of the solid state transistorized chopper Q-8 and Q-9 and its associated capacitors and resistors is then applied to SCR-1, causing it to become a low impedance circuit for the duration of the pre-determined time constant of R-26 and C-5. While the impedance of SCR-1 is low, a potential is applied across R-24, which in turn causes transistor Q-11 to conduct and amplify. When transistor Q-11 conducts, transistor Q-7 becomes non-conductive. Therefore, transistor Q-10 and its associated components form a multi-vibrator having an output of approximately 20,000 cycles, in the present instance. This of course could be varied, so as to suit any specific and desired condition, without departing from the spirit of the invention.

The signal generated is essentially a square wave, which means that on the secondary of transformer T-4, we are alternately biasing one of two transistors, Q-8 or Q-9, so that they are conducting on one half the cycle and non-conducting on the other half of the cycle. When the signal is generated through the ampere sensing leads J-1 and J-2, which are across the millivolt meter M, the D.C. signal is fed into the solid state transistorized chopper Q-8 and Q-9 and transformers T-3 and T-4 and their associated resistors and capacitors for conversion to A.C. and amplification. The A.C. signal output of transformer T-3, T-4 and resistor R-27 is then proportional to the D.C. input into the ampere sensing leads J-1 and J-2 at 20,000 cycles. J-3 and J-4 are recorder jacks, if recording is necessary.

When the amplitude of the A.C. signal reaches a value of approximately one half volt, the SCR-1 fires, because there is a low voltage drop across the D.C. ammeter A. The circuit is therefore non-conductive until there is a potential between the gate G and the cathode K. Prior to the firing of SCR-1, condenser C-5 was charged so that its potential is about 11 volts. However, when SCR-1 fires, condenser C-5 discharges through the current limiting resistor R-26, down to a point below which this SCR-1 will maintain conduction. In order for the SCR to maintain a conductive condition, it requires the maintaining of a certain minimum current at all times and if this potential is low enough so that it falls below the holding current, the SCR will extinguish itself, after which it will take take a higher anode potential along with its appropriate potential to fire again. Resistors R-24 and R-25 are high enough so that when capacitor C-5 discharges, they are limiting the current below the holding current of the SCR. We have a time function in which the capacitor C-5 will build up to a point at which it will hold the anode potential down while it is charging up and when it charges up to a given point which is coincident with the next pulse into the gate, the SCR will fire again and it will continue to fire until such time as the potential at R-27 is below the gate firing voltage. When this occurs and the potential is reduced from point Z to point W to a pre-determined value, no matter what is put on below this pre-determined value, SCR-1 will no longer fire. Condenser C-5 after discharge immediately starts to re-charge with a characteristic charge curve. However, when condenser C-5 discharges, it brings point K on SCR-1 down to ground and point A on SCR-1 down to about one-half volt. As points K and A are brought down, the base of the transistor Q-11 becomes negative and therefore conducts. When this occurs, point K on SCR-1 becomes more positive. While R-13 and R-16 are normally conducting through transistor Q-7, and the relationship between points B-1 and B-2 is such that the voltage is negative due to the current flow, they therefore become a voltage divider. The collector B-2 is normally more positive and when the SCR-1 fires, B-2 becomes negative and B-1 becomes positive.

When the condenser C-5 discharges and SCR-1 stops firing, resistors R-25 and R-26 permit the recharging of the condenser C-5. When it reaches a potential at which, if the signal is still present, SCR-1 will fire again. Because there is no current flowing through gate G on SCR-1, transistor Q-11 is biased so that it is no longer active in the circuit. This potential has the same characteristic condition as B-1 on transistor Q-3. Since transistor Q-11 conducts during cut-off and as the condenser charges up, there is some point at which the circuit will return to normal. When this occurs and the circuit is within one cycle of the pre-selected 20,000 cycles and the signal is still present, the SCR-1 will fire again. The firing of the SCR-1 occurs before the meter inertia is sufficient to cause an overload. The time element is approximately 40 milliseconds and the shut-off time is strictly a function of one cycle of the 20,000 cycles, while the turn-on time is approximately 20 milliseconds.

The Zener Z-3 is used to protect the chopper circuit in the event of a high voltage being applied thereto, while switch SW-1 is tied in with the on-off switch SW-10, so that when the switch is turned off, there is sufficient capacity to maintain a potential across capacitor C-1. This means we could have a potential out to the output jacks, however at the instant of cut off, T-2 is off and the capacity of C-4 is low as compared to the capacity of C-1. Therefore C-1 discharges rather rapidly through the series resistors R-13, R-14 and R-15 and we do not have the ability to have our sense circuit cut off because we have no potential to reverse bias. There is an instant at which if J-2 and J-4 are connected to an external circuit and J-1 and J-3 where connected to an external circuit when the switch was turned off, we would have a potential due to the storage of the capacitor C-1 and we would have no potential to give us our reverse bias to cut off. This switch effectively short circuits the meter input circuit so that if a potential does exist, it protects the meter during that instant of shut off.

J-1 and J-2 are the current leads, while J-3 and J*4 are the millivolt leads.

For all practical purposes, the above described is essentially a bridge circuit, with a positive potential on B-1 and a negative potential on B-2. If two voltage dividing resistors E-1 and B-1 are used and B-1 is negative with respect to E-1 and we substitute resistor R-13 with another transistor, we can change its value immediately and by taking R-15 out, we have cut-out and the polarity of B-1 is now positive. Therefore, what we are doing is sampling the test circuit at pre-determined time intervals. In this particular instance, the time element is 40 milliseconds. If at that particular instant the condition is still bad, we automatically shut-off again. The Zener diode Z-3 is located between the transformers T-3 and T-4 for current regulation, while switch SW-1 shown closed is for the purpose of shunting the meter M in the 10 millivolt scale. Switch SW-10 shown open is the power switch for actuation of the entire unit.

While it is possible to control the above identified device manually and reduce the number of components used, the overall utility of the device is reduced substantially.

The above described invention is simple, lightweight and self-contained. It can be operated by skilled and non-skilled personnel under and and all conditions without undue hazard. The meter is protected at all times, it has an accuracy in the one percent range. The above identified device also has a direct reading meter.

Having thus described my invention, I claim:

1. In an electronic device for the measurement of millivolt drop, the combination of,
    a source of current regulated power;
    a set of probes to apply the power to a load under test whose millivolt drop is to be measured;
    means including switch means external to said source of power, said switch means coupling the current regulated power source to the probes;
    silicon controlled rectifier means responsive to voltage drop across the load for opening the switch when the voltage drop exceeds a first prescribed threshold and for closing the switch when the voltage is below a second prescribed threshold;
    and millivolt meter means for measuring the millivolt drop across the load.

2. An electronic device as in claim 1, wherein the means is operable without manually disconnecting the circuit under test.

3. An electronic device as in claim 1, wherein the millivolt drop is fed directly into the millivolt drop meter and a sensing circuit, where the signal is converted to an A.C. potential proportional to the D.C. millivolt drop so that when the millivolt drop reaches a pre-determined level, the converted A.C. signal triggers said silicon controlled rectifier to unbalance a bridge, reducing the current flow to almost zero, thereby preventing damage to the millivolt meter and when the bridge is returned to a balanced condition, the millivolt meter circuit is again reactivated so that a successive reading can be taken.

References Cited
UNITED STATES PATENTS

| | | | |
|---|---|---|---|
| 3,163,814 | 12/1964 | Todd | 317—33 X |
| 3,223,915 | 12/1965 | Ryerson | 323—22 X |

RUDOLPH V. ROLINEC, *Primary Examiner.*

J. MULROONEY, *Assistant Examiner.*